(12) United States Patent
Coenen

(10) Patent No.: US 6,516,601 B2
(45) Date of Patent: Feb. 11, 2003

(54) MAGNETIC BEARING ARRANGEMENT FOR AN OPEN-END SPINNING DEVICE

(75) Inventor: Norbert Coenen, Mönchengladbach (DE)

(73) Assignee: W. Schlafhorst AG & Co. (DE)

( * ) Notice: Subject to any disclaimer, the term of this patent is extended or adjusted under 35 U.S.C. 154(b) by 76 days.

(21) Appl. No.: 09/852,544

(22) Filed: May 10, 2001

(65) Prior Publication Data

US 2002/0002816 A1 Jan. 10, 2002

(30) Foreign Application Priority Data

May 10, 2000 (DE) .......................... 100 22 736

(51) Int. Cl.$^7$ ................................ D01H 4/12
(52) U.S. Cl. .................. 57/406; 310/90.5; 57/264
(58) Field of Search .................. 57/400, 404, 405, 57/406, 407, 408, 409, 410, 411, 412, 413, 414, 415, 416, 417, 264; 310/74, 90, 90.5, 112, 113, 165

(56) References Cited

U.S. PATENT DOCUMENTS

| | | | | |
|---|---|---|---|---|
| 4,340,261 A | * | 7/1982 | Wehde | 310/90.5 |
| 5,576,587 A | * | 11/1996 | Takahashi et al. | 310/90.5 |
| 5,998,899 A | | 12/1999 | Rosen et al. | 310/90.5 |
| 6,124,658 A | * | 9/2000 | Coenen | 310/90 |

FOREIGN PATENT DOCUMENTS

| | | |
|---|---|---|
| DE | 25 37 597 A1 | 3/1977 |
| DE | OS 28 18 255 A1 | 11/1979 |
| DE | 31 20 691 A1 | 12/1982 |
| DE | 3130974 A1 * | 2/1983 |
| DE | 31 30 974 A1 | 2/1983 |
| DE | 31 30 974 | 2/1983 |
| DE | 38 19 205 A1 | 6/1989 |
| DE | 198 27 606 A1 | 12/1999 |
| JP | A 07-180724 | 7/1995 |

OTHER PUBLICATIONS

German Search Report.
European Search Report dated Aug. 2, 2001.

* cited by examiner

*Primary Examiner*—John J. Calvert
*Assistant Examiner*—Shaun R Hurley
(74) *Attorney, Agent, or Firm*—Kennedy Covington Lobdell & Hickman, LLP

(57) ABSTRACT

A method of operating an open-end spinning device (1) whose spinning rotor (3) is supported with its rotor shaft (4) radially and axially positioned via a magnetic bearing arrangement (5) which comprises two magnetic bearings with spaced permanent magnet pairs (33, 34 and 43, 44), a central position control device (50) with actor coils (32, 42), and a rotor position sensor (51). An output signal (ASLS) of the position sensor (51) is processed in the central position control device (50) such that a coil current (i) initiated by a controller (53) is initially regulated toward zero by negative feedback of an integrator (55). A positive feedback of the coil current (i) subsequently takes place by negation of the input signal (ESI) of the integrator to at least intermittently increase the coil current (i) in the actor coils (32, 42) and thereby lift and transfer the spinning rotor (3) from its axial catch bearing (45) into its operating position wherein the coil current (i) is regulated back toward zero in the actor coils (32,42).

11 Claims, 5 Drawing Sheets

MAGNETIC BEARING ARRANGEMENT FOR AN OPEN-END SPINNING DEVICE

CROSS-REFERENCES TO RELATED APPLICATIONS

This application claims the benefit of German patent application DEP10022736.8, filed May 10, 2000, herein incorporated by reference.

BACKGROUND OF THE INVENTION

The present invention relates to a method of operating a magnetic bearing arrangement for an open-end spinning device and to a corresponding magnetic bearing arrangement.

In the spinning devices of modern open-end spinning machines, various types of specific embodiments are known for supporting spinning rotors that rotate at a high speed. Most of the open-end spinning machines currently on the market comprise spinning rotors that are supported with their rotor shaft in the bearing nip of a so-called support disk bearing. It is customary in such support disk bearings to provide an addition axial bearing for axially fixing of the spinning rotor, which axial bearing can be designed either as a mechanical bearing or as a magnetic bearing. Such bearing arrangements permit rotor speeds of greater than 100,000 revolutions per minute.

Even though these support-disk bearing arrangements have proven themselves in practice, they have the disadvantage that they are subjected to significant mechanical strain, especially in the area of the running surfaces of the support disks. The pressing operation occurring in these areas results on the one hand in a not insignificant wear and on the other hand in energy losses. Therefore, attempts have already been made in the past to support such spinning rotors without wear while rotating at high speed.

For example, German Patent Publications DE-OS 28 18 255, DE 31 30 974 A1 or DE 198 27 606 A1 describe spinning rotors that are driven by an individual motor and are supported in a contactless manner in appropriate magnetic bearing arrangements.

German Patent Publication DE-OS 28 18 255 describes a magnetic bearing arrangement comprising at least one ring-shaped or disk-shaped permanent magnet on the stator side and on the rotor side. The permanent magnets are arranged in such a manner that repelling magnetic bearing forces are active between rotor and stator. In addition, electric windings are provided between the permanent magnets of the stator via which windings the magnetic force can be strengthened or lowered as a function of the direction of electric current flow.

The electric windings are controlled via an appropriate control device as a function of signals of a sensor that detects the axial deviation of the rotor from its theoretical ideal or pre-calculated position. Thus, a control current is brought about upon an external, axial loading of the rotor which control current generates an opposing electromagnetic force corresponding to this external loading. This known type of control requires a high sensor precision that can only be achieved with very complicated and correspondingly expensive sensors.

German Patent Publication DE 31 30 974 A1 describes a similarly designed magnetic bearing arrangement for an open-end spinning device. Like the previously described device, this known bearing arrangement comprises a control device reacting to a sensor signal and comprises at least one electromagnet controlled by this control device for producing an axial rotor movement. A speed sensor reacting to axial movements of the spinning rotor is used thereby as sensor.

The control device is designed so that in the theoretical position of the spinning rotor the current for the electromagnet is at least approximately zero. For this purpose, this known control device has a PD (proportional-derivative) controller with positive feedback, the input of which is connected to the speed sensor.

Even the magnetic bearing arrangement described above has not been convincing in practice in combination with open-end spinning devices. In particular, the use of a speed sensor has proved to be problematic since such sensors react extremely sensitively to magnetic interference fields like those that are almost unavoidable in conjunction with individual electric motor drives.

Moreover, German Patent Publication DE 198 27 606 A1 teaches a magnetic bearing arrangement in which the rotor shaft of the spinning rotor is supported without contact in two permanent magnet pairs arranged at an axial spacing. The permanent magnet pairs are designed so that unequal magnet poles are opposite each other. In order to maintain a central axial position of the spinning rotor, an electromagnetic central position control is also provided. In particular, the axial central position control of the spinning rotor takes place by an appropriate, purposeful supply of current to at least one coil arranged in the vicinity of the stator permanent magnet. Additionally, a preferred direction of fall of the spinning rotor is realized in this known magnetic bearing device by an appropriate magnetic designing of the front and rear magnetic bearing components.

SUMMARY OF THE INVENTION

In view of the state of the art discussed above, it is accordingly an object of the present invention to develop a method of frictionless operation of a magnetic bearing arrangement for open-end spinning devices in which the magnetic bearing arrangement should be economical to manufacture and also reliable during operation.

The invention addresses this objective by providing an improved method of operating an open-end spinning device having a spinning rotor supported by a rotor shaft both radially and axially in a magnetic bearing arrangement comprising spaced permanent magnet pairs and an electromagnetic central position control device comprising a sensor device and a pair of actor coils that can be supplied with current in a defined manner. According to the present invention, the method comprises the processing of a signal of a rotor position sensor in the central position control device by initiating a coil current by a controller and initially regulating the coil current toward zero by negative feedback of an integrator. Subsequently, a positive feedback of the coil current is produced by negating an input signal of the integrator which positive feedback results in an at least intermittent increase of the coil current in the actor coils and thereby lifts the spinning rotor from its axial catch bearing and transfers the spinning rotor into its operating position. Thereafter, the coil current in the actor coils is regulated back toward zero in the operating position of the spinning rotor.

The method in accordance with the invention has the particular advantage that a simple and economic position sensor can be used for detecting the position of the magnetically supported spinning rotor which sensor must meet only relatively low requirements, especially as regards the precision and stability of the zero or neutral point. That is, the control device utilized in the present invention first processes the signal of the bearing sensor in such a manner that a negative feedback of the coil current is initiated by the integrator, that has the result that after only a short time the coil current is adjusted in the actors with sufficient precision toward zero. The negation of the input signal of the integrator subsequently results in a positive regenerative feedback in the control loop and therewith in a rise of current in the actor coil or coils, as a result of which the spinning rotor is lifted off of its axial catch bearing and adjusted into its operating position in which the coil current in the actors again moves toward zero.

The position sensor is designed as an inductive sensor whose output signal can be processed by a PD controller and an integrator and whose input signal can be negated in a simple manner for controlling the actors, that can be supplied with current, of the central position control device.

In a preferred embodiment, the position sensor generates an output signal whose value is directly proportional to the spacing between the rotor-shaft end and the position sensor.

Interference signals are preferably minimized by a filter/amplifier unit that is connected between the position sensor and the PD controller. The PD controller is advantageously connected on the output side via a power amplifier to the actors and to the integrator.

Moreover, in a preferred embodiment the integrator is connected on the input side to a negation unit and to offset input means.

The input signal of the integrator can be simply and reliably processed in such a manner via the negation unit in conjunction with the offset input means that a positive feedback of the coil current is produced, which finally results in a reliable lifting of the spinning rotor from its axial catch bearing. The offset input means thereby unambiguously defines the polarity of the coil current and therewith the direction of force so that a reliable lifting of the spinning rotor from its axial catch bearing is assured at all times.

An alternative design is also possible in which the input signal of the integrator is derived directly from the output signal of the PD controller or directly from the output signal of the filter/ amplifier unit.

Instead of a negation unit it can also be provided that the integrator can be connected on the input side to a point in the control loop which point has a negation of the signal. That is, the integrator can be connected via an appropriate connecting means directly to the output, which is negated in such an instance, of the filter/amplifier unit or to the negated output of the PD controller.

A possible design variant of the invention also consists in deriving the input signal of the integrator directly from the position sensor.

Further details, features and advantages of the present invention will be understood from the following description of an exemplary embodiment with reference to the accompanying drawings.

DESCRIPTION OF THE PREFERRED EMBODIMENT

Figure 1:
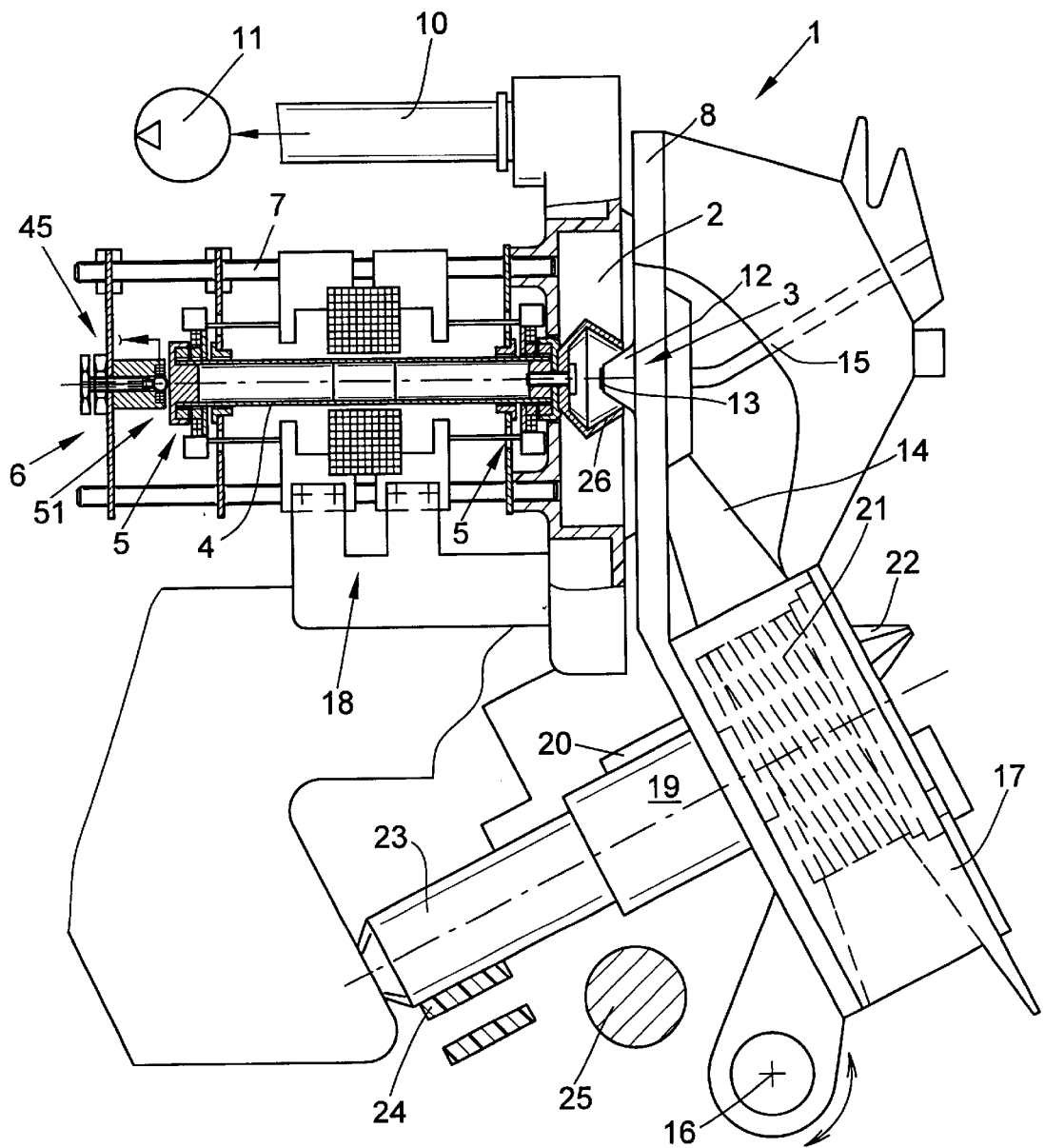
FIG. 1 is a side elevational view, partially in cross-section, of an open-end spinning device with a spinning rotor driven by a single motor and supported with its rotor shaft in a magnetic bearing arrangement, in accordance with the present invention.

Referring now to the accompanying drawings and initially to FIG. 1, the entire open-end spinning device shown in FIG. 1 is denoted by reference numeral 1. As is known and customary, open-end spinning device 1 comprises a rotor housing 2 in which a spinning cup 26 of a spinning rotor 3 rotates at a high speed. Spinning rotor 3 is driven by an individual electric motor drive 18 and is supported with its rotor shaft 4 in a magnetic bearing arrangement 5, having permanent-magnetic bearing components 32, 33, 34; 42, 43, 44 which support rotor shaft 4 radially as well as axially.

As is known, rotor housing 2 is open to the front side of the spinning station and is closed during operation by a pivotably mounted cover element 8. In addition, rotor housing 2 is connected via an appropriate suction line 10 to a vacuum source 11 that generates the spinning vacuum necessary in rotor housing 2.

A conduit plate adapter 12 is arranged in cover element 8 or in the conduit plate, as is also customary, which adapter comprises a yarn withdrawal nozzle 13 as well as the mouth area of a yarn guide conduit 14. Yarn withdrawal tube 15 follows the yarn draw-off nozzle 13.

Cover element 8 is supported in a manner such that it can rotate in a limited manner about pivot shaft 16. Cover element 8 comprises an opening cylinder housing 17 and support brackets 19, 20 on its rearward side for supporting an opening roller 21 and a sliver delivery cylinder 22. Opening roller 21 is driven in the area of its whorl 23 by a traveling tangential belt 24 which extends the length of the machine whereas the sliver delivery cylinder 22 is driven via a worm drive arrangement (not shown) connected to a drive shaft 25 which likewise extends the length of the machine.

Figure 2:
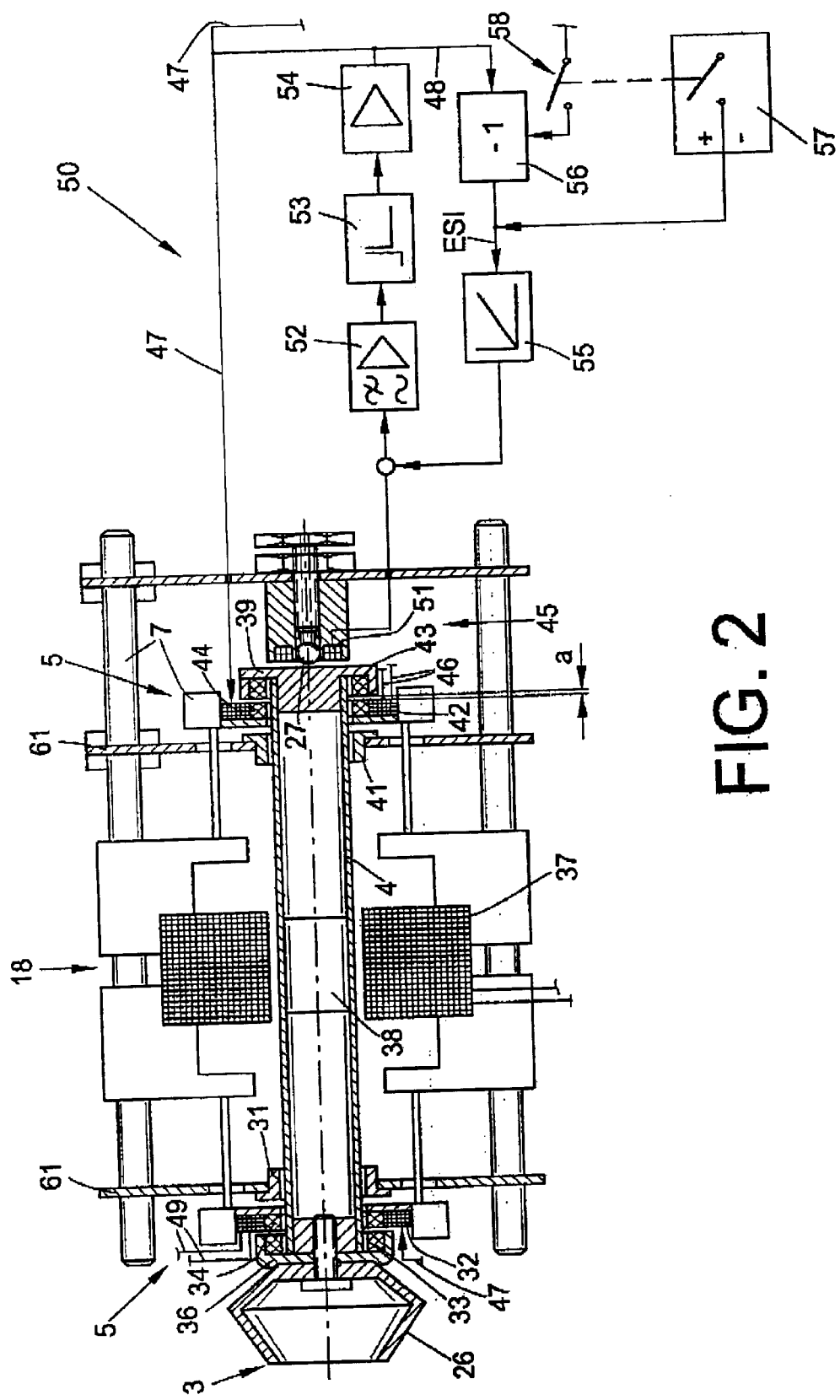
FIG. 2 is an axial cross-sectional view on a larger scale of the magnetic bearing arrangement of FIG. 1, depicting its central position control device in accordance with the present invention.

FIG. 2 shows the magnetic bearing arrangement 5 of FIG. 1 on an enlarged scale. In a preferred embodiment, magnetic bearing arrangement 5 comprises an axial catch bearing 45 on its rear side for the rotor shaft 4. The construction of magnetic bearing arrangement 5 as shown is at least partially determined by individual drive 18 used with its motor magnets 38 and its motor coil 37.

In an advantageous embodiment, limiting bearings 31, 41 constituting radial end stops for rotor shaft 4 are fixed on stator housing 7 and on screening walls 61. These limiting bearings 31, 41, on the one hand, prevent spinning rotor 3 or rotor shaft 4 from being able to run against relatively sensitive magnetic bearing components 34, 44 upon the occurrence of oscillations and, on the other hand, assure that even a running of rotor cup 26 against other spinning components (not shown) is prevented. Moreover, the influencing of magnetic bearing components by the magnetic fields of electromagnetic individual drive 18 is minimized by screening walls 61.

The non-rotating components of magnetic bearing arrangement 5, specifically magnetic bearing coils 32, 42 with their connections 49, 46 as well as bearing magnets 34, 44, are fixed on stator 7. Bearing magnets 34, 44, preferably designed as permanent magnets, are opposed at a slight spaced interval by corresponding bearing magnets of the rotor designated by reference numerals 33, 43, which are also preferably designed as permanent magnets. Front bearing magnet 33 is arranged, e.g., in rotor-cup receptacle 36 whereas rear bearing magnet 43 is arranged in a bearing cover with reference numeral 39. Bearing cover 39 and rotor-cup receptacle 36 are attached on the front side to rotor shaft 4 and grip with corresponding attachments into preferably hollow rotor shaft 4. In addition, as is apparent from the drawing figures, rotor cup 26 of spinning rotor 3 is fastened to rotor-cup receptacle 36.

As already indicated above, bearing magnet 43 is arranged in the end area of rotor shaft 4 in bearing cover 39, which magnet 43 corresponds to rear bearing magnet 44 arranged on stator housing 7. In addition, bearing coil 42 designed as an actor is arranged with its connections 46 in the area of rear bearing magnet 44.

Moreover, FIG. 2 shows a central position control device indicated in its totality by reference numeral 50 and depicted schematically in the form of a block diagram. This central position control device 50 specifically comprises a bearing sensor 51 integrated, e.g., into axial catch bearing 45, as well as a filter/amplifier unit 52, a PD controller 53, a power amplifier and an integrator 55. In addition, a negation unit 56 and an offset input means 57, that can be actuated via a switch 58, are provided for influencing the input signal (ESI) of integrator 55.

The operation of the open-end spinning device may thus be understood. In order to start up the open-end spinning device 1 from a standstill, the central position control device 50 of the particular open-end spinning device 1 is first actuated by a control device, preferably the winding head computer of the particular winding head. That is, central position control device 50 first automatically carries out a zero balancing of the coil current (i) taking into consideration the sensor offset of bearing sensor 51.

The basis for this zero balance is the position of spinning rotor 3 in the limiting bearing. That is, in an advantageous embodiment, spinning rotor 3 rests at the beginning of the startup with the end of its rotor shaft 4 on axial catch bearing 45 on account of its preferred direction of fall. In the exemplary embodiment shown, position sensor 51 is integrated in this axial catch bearing 45, which sensor 51 is preferably designed as an inductive sensor.

Thus, when a defined, high-frequency alternating voltage is generated in an appropriate coil of bearing sensor 51, the damping of this coil by the end of rotor shaft 4 results in a sensor output signal corresponding to the rotor position. This so-called position sensor output signal (ASLS) is first processed, as is known, in filter and amplifier unit 52 and then passes to PD controller 53.

The processed position sensor output signal (ASLS) is converted in PD controller 53 in a manner such that actors 32 and 42 in the range of magnetic bearing arrangements 5 are supplied with current from a subsequent power amplifier 54 via leads 47 and 48.

Integrator 55, that is connected on the output side directly or indirectly to the input side of PD controller 53, retroacts in such a manner into the control thereby that a negative feedback of the coil current (i) is produced at spinning rotor 3 resting on axial catch bearing 45 which negative feedback first results in an automatic zero balance of the coil current (i) in actors 32 and 42.

Finally, negation unit 56 and offset input means 57 are activated by windinghead computer 4, e.g., via switch 58.

The negation of the input signal (ESI) of integrator 55 subsequently results in a positive feedback of the coil current (i), during which the polarity of the current increase is given by offset input means 57. Finally, the current increase in actor coils 32, 43 initiates the lifting of spinning rotor 3 from its axial catch bearing 45 and the transfer of spinning rotor 3 into its operating position in which magnetic bearing components 33, 34 and 43, 44 of magnetic bearing arrangement 5 have a mutual spaced interval a.

As soon as spinning rotor 3 has reached its operating position, as detected by position sensor 51, the coil current (i) in actors 32 and 42 is again regulated toward zero or at least is regulated down sufficiently that a stable central position is assured in the magnetic equilibrium of spinning rotor 3 during the spinning operation.

Figure 3:
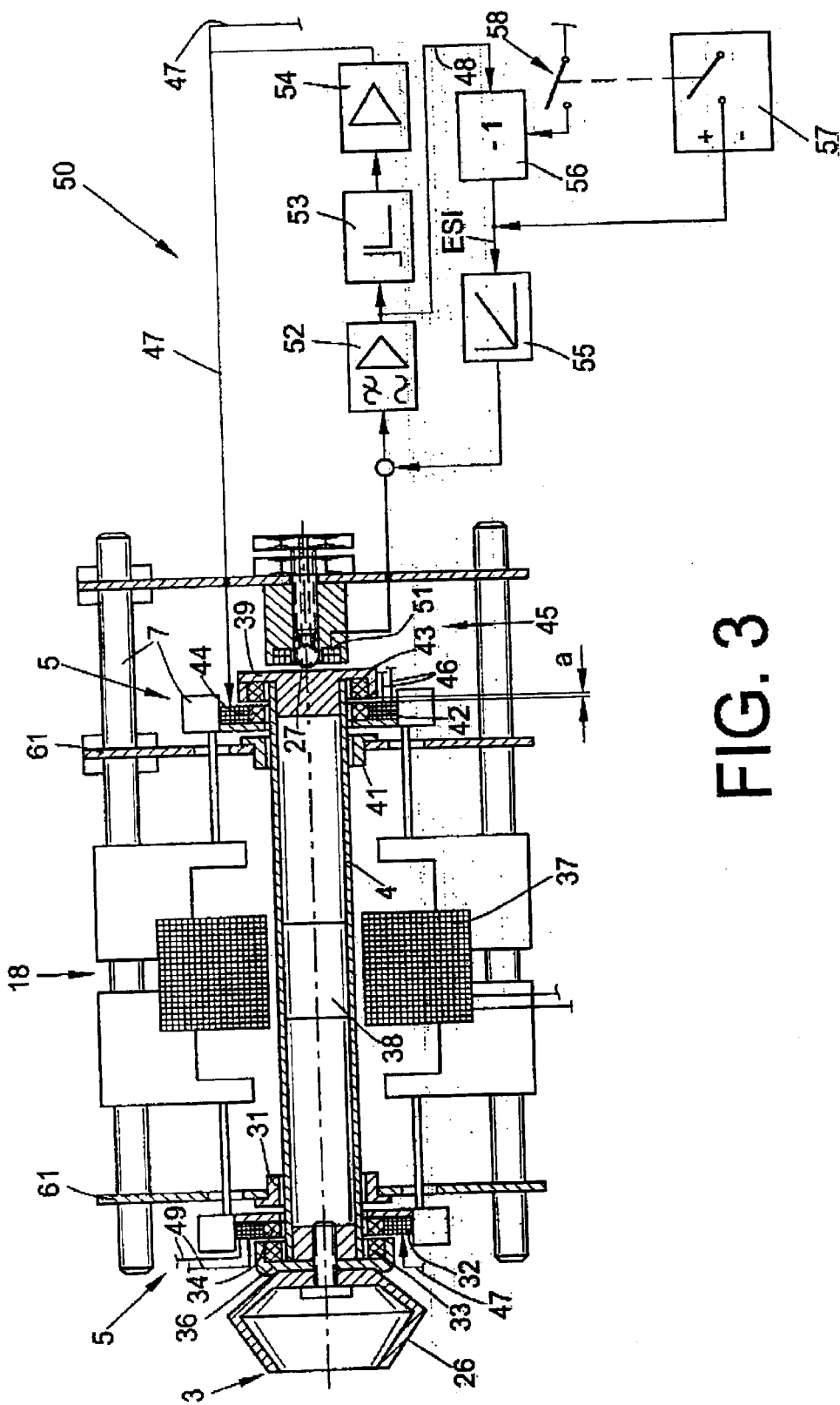
FIGS. 3–5 are axial cross-sectional views similar to FIG. 2, showing alternative embodiments of the central position control device in accordance with the present invention.
Figure 4:
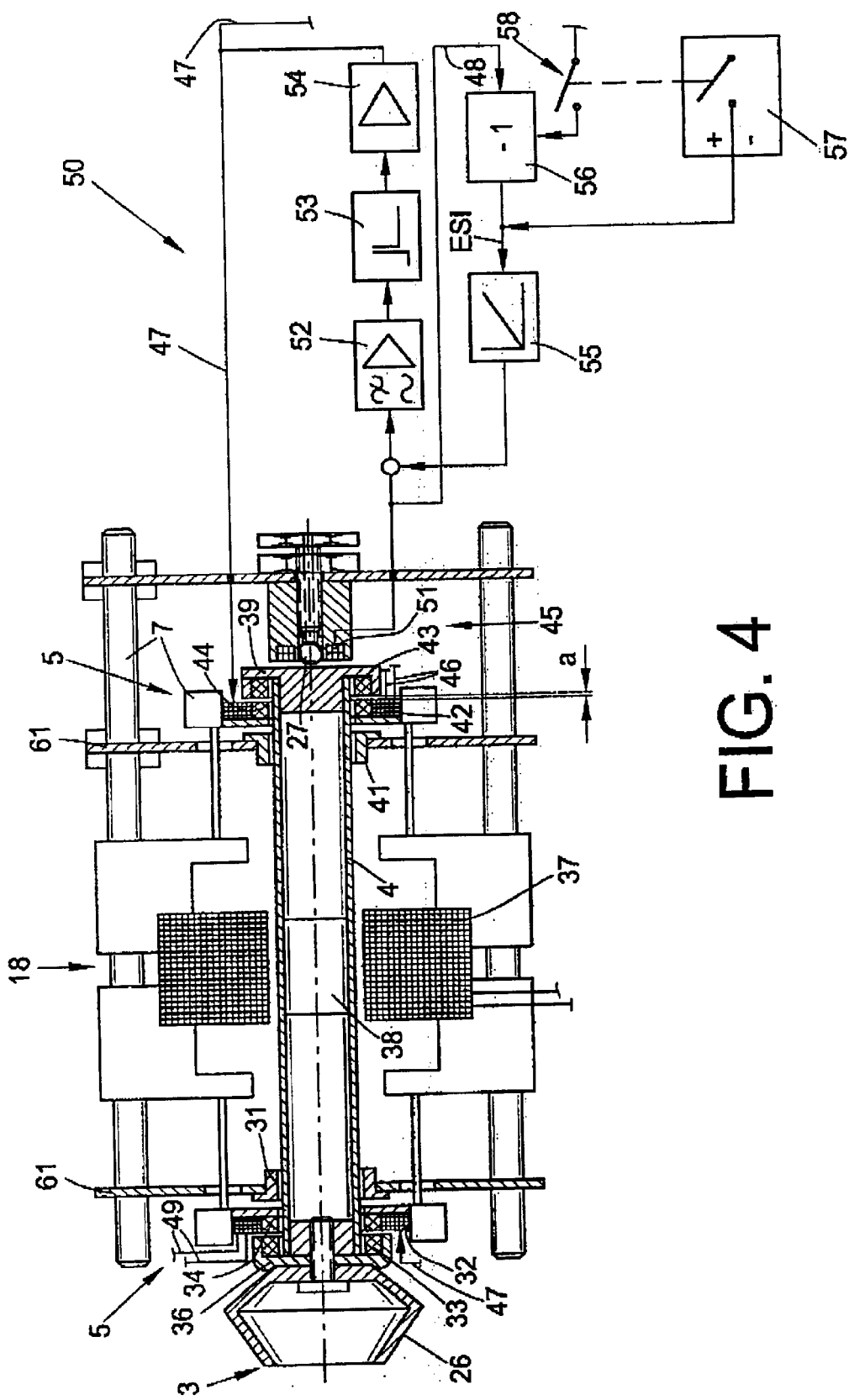
Figure 5:
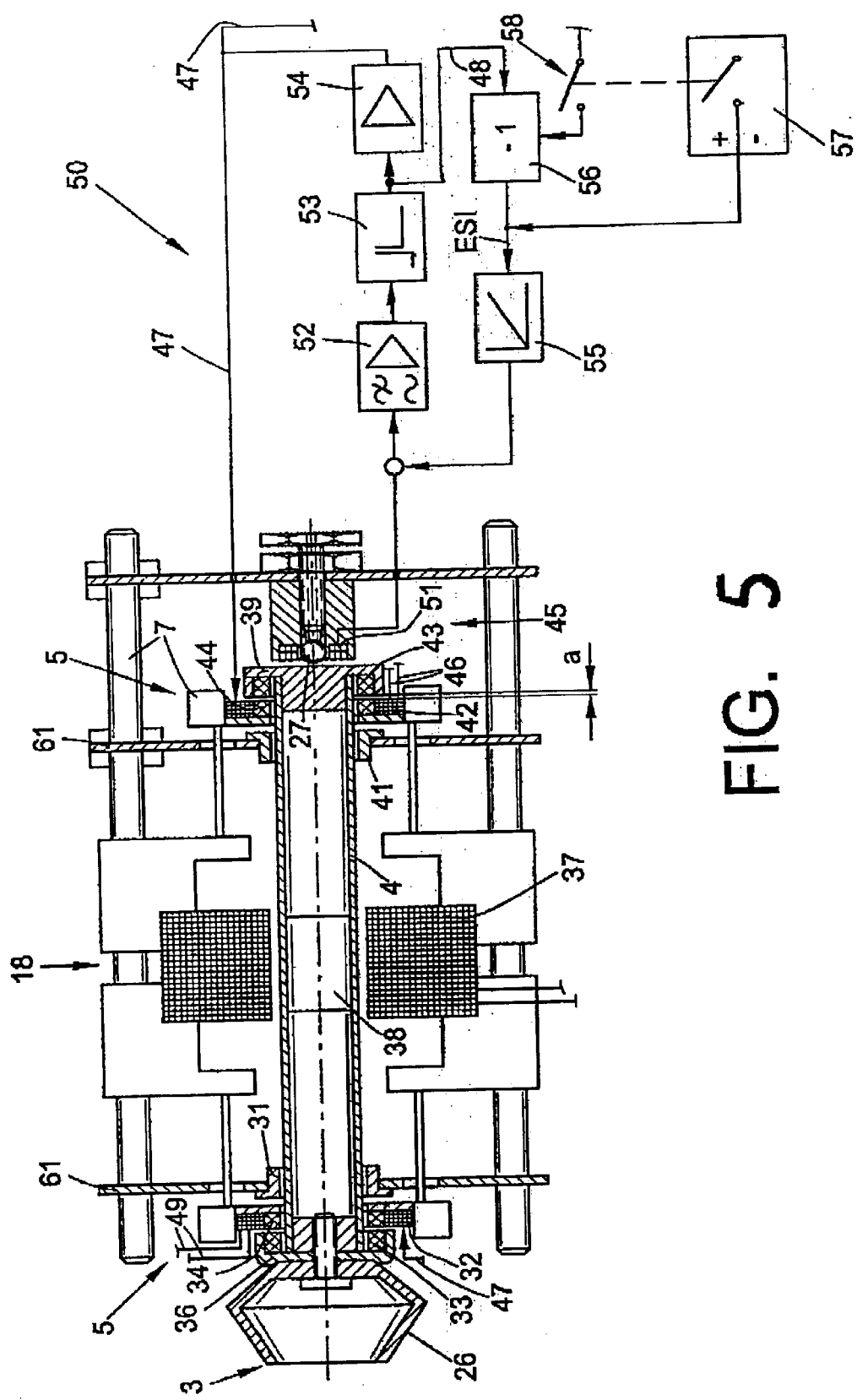

In alternative embodiments of the central position control device 50 shown in FIGS. 3–5, the input signal 48 to the integrator 55 via the negation unit 56 maybe derived directly from the output of the filter and amplifier unit 52 (FIG. 3), the output of the rotor position sensor 51 (FIG. 4), or the output of the PD controller 53 (FIG. 5).

It will therefore be readily understood by those persons skilled in the art that the present invention is susceptible of broad utility and application. Many embodiments and adaptations of the present invention other than those herein described, as well as many variations, modifications and equivalent arrangements, will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements, the present invention being limited only by the claims appended hereto and the equivalents thereof.

What is claimed is:

1. A method of operating an open-end spinning device having a spinning rotor supported by a rotor shaft both radially and axially in a magnetic bearing arrangement comprising spaced permanent magnet pairs and an electromagnetic central position control device comprising a sensor device and at least one actor coil that can be supplied with current in a defined manner, the method comprising processing a signal of a rotor position sensor in the central position control device by initiating a coil current by a controller and initially regulating the coil current toward zero by negative feedback of an integrator, subsequently producing a positive feedback of the coil current by negating an input signal of the integrator which positive feedback results in an at least intermittent increase of the coil current in the actor coil and thereby lifting the spinning rotor from its axial catch bearing and transferring the spinning rotor into its operating position, and subsequently regulating the coil current in the actor coil back toward zero in the operating position of the spinning rotor.

2. In an open-end spinning device having a spinning rotor with a rotor shaft, a magnetic bearing arrangement for supporting the rotor shaft both radially and axially, the magnetic bearing arrangement comprising spaced permanent magnet pairs and an electromagnetic central position control device comprising at least one rotor position sensor designed as inductive sensor, at least one actor coil that can be supplied with current in a defined manner, a PD controller, and an integrator whose input signal can be negated.

3. The magnetic bearing arrangement according to claim 2, characterized in that an output signal can be generated by the rotor position sensor of a signal value proportional to a spacing between an end of the rotor shaft and the rotor position sensor.

4. The magnetic bearing arrangement according to claim 2, characterized in that the rotor position sensor is connected to the PD controller by a filter and amplifier unit connected therebetween.

5. The bearing arrangement according to claim 4, characterized in that the input signal of the integrator is derived directly from an output of the filter and amplifier unit.

6. The magnetic bearing arrangement according to claim 2, characterized in that the PD controller is connected via a power amplifier to at least one of the actor coils and to the integrator.

7. The magnetic bearing arrangement according to claim 2, characterized in that the integrator is connected on an input side to a negation unit that can be switched in a defined manner.

8. The magnetic bearing arrangement according to claim 2, characterized in that the integrator can be connected on an input side to a point in a control loop having a negation of the input signal.

9. The magnetic bearing arrangement according to claim 2, characterized in that the integrator is connected on an input side to an offset input means that determines the polarity of a current increase.

10. The bearing arrangement according to claim 2, characterized in that the input signal of the integrator is derived directly from an output of the PD controller.

11. The bearing arrangement according to claim 2, characterized in that the input signal of the integrator is derived directly from an output of the rotor position sensor.

* * * * *